Figure 1:
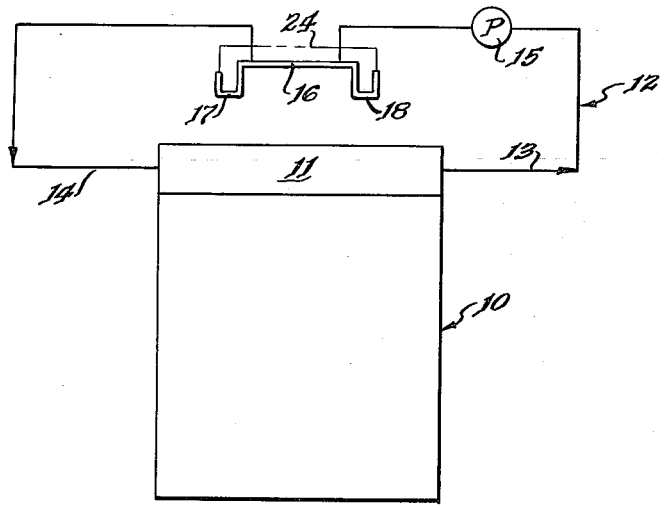

INVENTORS
Richard R. Smith
Maurice William Echo
Charles B. Doe

Attorney

United States Patent Office

3,116,211
Patented Dec. 31, 1963

3,116,211
METHOD AND APPARATUS FOR EXAMINING
FUEL ELEMENTS FOR LEAKAGE
Richard R. Smith, Maurice William Echo, and Charles B. Doe, Idaho Falls, Idaho, assignors to the United States of America as represented by the United States Atomic Energy Commission
Filed May 31, 1962, Ser. No. 199,206
3 Claims. (Cl. 176—19)

This invention deals with a method of examining fuel elements of nuclear reactors for leaks and with an apparatus for carrying out the method. More particularly, the invention is applicable to fuel elements used in liquid-metal-cooled reactors in which the liquid metal is protected against oxidation by a blanket of argon. Examples of such reactors are the Experimental Breeder Reactors which are described in many publications, for instance in Proceedings of the International Conference on Peaceful Uses of Atomic Energy, both of 1955 and 1958.

During the neutron bombardment of uranium and/or plutonium, fission products are formed, among them noble gases, such as krypton and zenon. In the case of cracks or holes in the jackets of the fuel elements, these gases leak out and enter, for instance, the coolant metal and the argon blanket and contaminate them, which is a highly undesirable, because hazardous, condition.

The noble gases decay by beta-emission to form radioactive, beta-emitting, alkali metal daughters. For instance, $Kr^{89}$ decays to $Rb^{89}$, $Kr^{91}$ to $Rb^{91}$ and $Kr^{92}$ to $Rb^{92}$; analogously, xenon isotopes are converted to the corresponding cesium isotopes. Argon, of course, also reacts with neutrons and forms an alkali metal, potassium, via an unstable argon isotope, $A^{41}$; however, there the stable nonradioactive isotope, $K^{41}$, is formed.

It is an object of this invention to provide means for the continuous examination of the fuel elements for leakages during the operation of the nuclear reactor.

It is also an object of this invention to provide means for the prompt discovery of leakages in fuel element jackets.

According to this invention argon gas is continuously withdrawn from the reactor blanket and contacted with a strong negative electrical charge which attracts and carries any alkali metal formed by reaction of neutrons with noble gases, the negative charge is then introduced into water where alkali metal is dissolved, the gas is cycled back into the reactor blanket, and the water is tested for radioactive alkali metals.

The presence of beta activity in the water is a definite indication for a leakage in one of the fuel element jackets, because, as mentioned, only the fission gases krypton and xenon yield radioactive alkali metal isotopes, while the argon of the blanket decays to $K^{41}$ which is stable and therefore does not report in the counting results.

While the process of this invention can be carried out in different types of apparatus, the inventors have successfully used the device shown in the attached drawing.

Figure 2:
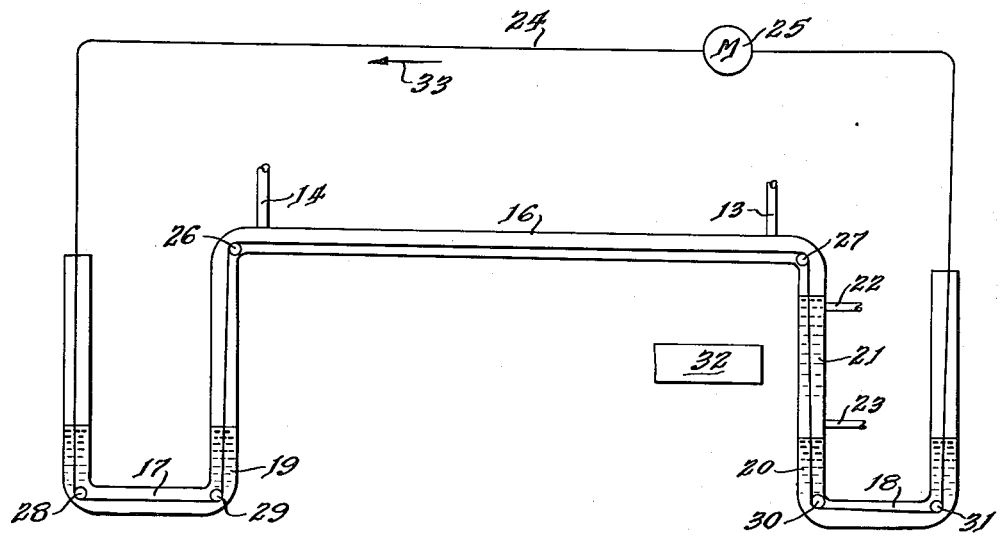

In this drawing, FIGURE 1 is a diagrammatic view of a nuclear reactor in which the monitoring device of this invention has been installed, and FIGURE 2 is a more detailed diagrammatic view of the monitoring device alone.

In these drawings the reference numeral 10 designates a nuclear reactor, details of which are not shown and are not part of this invention. A blanket 11 of argon gas is arranged in the top of the reactor. A circulation pipeline 12 is installed in this reactor 10, said pipeline comprising an outlet 13 for argon gas from the reactor and an inlet 14 for it back into the reactor. A pump 15 for the circulation of the argon gas is installed in the pipeline 12. A tube 16 connects two U-shaped seals 17 and 18, which are filled with mercury 19 and 20. On top of the mercury 20 in tube 18 there is arranged a layer of water 21. The section of tube 18 that contains the water layer 21 is provided with an inlet 22 and an outlet 23 for charging and discharging the water.

An endless wire electrode 24 is installed in the system so that it passes through the seal 17, tube 16, and seal 18. A motor 25 provides for continuous movement of the electrode; the wire is supported in the tube and seals by pulleys 26, 27, 28, 29, 30 and 31. A discriminating radiation detector 32 is arranged opposite the water layer 21 and, if desired, can be provided with a recording device (not shown).

In operating the monitoring device of this invention, the gas of the blanket 11 is circulated, by pump 15, out of the reactor 10 through outlet 13, tube 16 and back into the reactor through inlet 14. At the same time the endless wire electrode 24, charged with a high electric negative voltage, is moved in the direction of an arrow 33 by motor 25 through mercury seal 17, tube 16, water layer 21 and mercury seal 18. When krypton and xenon fission-product isotopes leak into the argon blanket 11, their alkali metal daughters which form by beta-decay are attracted by the wire 24 due to their positive charge and carried by it into the water layer 21 where they react with the water and are dissolved as the hydroxides. The beta particles emitted by the alkali metals in the water report in the detector 32.

It will be readily seen that any flaws in the fuel element which bring about leakage are observed promptly and that monitoring can be carried out continuously while the reactor is in operation.

The material of the electrode should be a good electrical conductor and should be nonreactive with water and mercury. Platinum has been found excellently suitable for this purpose, although other materials known to those skilled in the art may be used with equal satisfaction. The potential of the electronegative charge may vary widely; a potential of the order of 1000 volts has been found satisfactory.

It will be understood that the invention is not to be limited to the details given herein but that it may be modified within the scope of the appended claims.

What is claimed is:
1. A continuous process for monitoring jacketed fuel elements for leaks while in use in a liquid-metal-cooled, argon-blanketed nuclear reactor, comprising continuously withdrawing argon gas from the blanket, contacting the withdrawn gas with a strong negative electrical charge, introducing the negative charge into water where any alkali metal formed from noble gas by neutron reaction and carried by said negative charge is dissolved, cycling the gas back into the reactor blanket, and examining the water for radioactive alkali metals.

2. A monitoring device for discovering leaks in jackets of fuel elements while in use in a liquid-metal-cooled, argon-blanketed nuclear reactor, comprising a pipeline for circulating blanket gas out of the reactor and back into the reactor, said pipeline comprising an outlet arranged at one side of said blanket, an inlet at the other side of said blanket, and a tube between said inlet and said outlet; two seals, one at each end of said tube; a layer of water at one end of said tube between it and one of said two seals; an endless wire having a negative electric charge extending through said tube; means in said pipeline for circulating blanket gas; means for moving said wire through said tube and through said water layer; and means for detecting radioactivity in said water layer.

3. The device of claim 2 wherein the seals are U-shaped tubes containing mercury and the water layer is on top of the mercury in one seal.

References Cited in the file of this patent

FOREIGN PATENTS

| 1,261,628 | France | Apr. 10, 1961 |
| 630,619 | Canada | Nov. 7, 1961 |